United States Patent
Boudreaux et al.

(10) Patent No.: US 6,225,398 B1
(45) Date of Patent: May 1, 2001

(54) AQUEOUS DISPERSIONS OF POLYMERS

(75) Inventors: Chase J. Boudreaux, Memphis, TN (US); Stephen A. Fischer, Franklin; Kartar S. Arora, Racine, both of WI (US); Grannis S. Johnson, Durham, NC (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/045,133

(22) Filed: Mar. 20, 1998

Related U.S. Application Data

(60) Provisional application No. 60/042,357, filed on Mar. 25, 1997.

(51) Int. Cl.$^7$ .............................. C08J 3/00; C08K 3/20; C08L 75/00; C08F 8/30; C08F 283/04
(52) U.S. Cl. .................. 524/507; 524/502; 524/591; 524/839; 524/840; 525/123; 525/455
(58) Field of Search ..................... 524/502, 507, 524/591, 839, 840; 525/123, 455

(56) References Cited

U.S. PATENT DOCUMENTS

| | | |
|---|---|---|
| 3,862,074 | 1/1975 | Hickey . |
| 3,996,154 | 12/1976 | Johnson et al. . |
| 4,146,499 | 3/1979 | Rosano . |
| 4,954,559 | 9/1990 | Den Hartog et al. . |
| 5,051,464 | 9/1991 | Johnson et al. ............ 524/555 |
| 5,109,061 | 4/1992 | Speranza et al. . |
| 5,141,983 | 8/1992 | Hasegawa et al. . |
| 5,200,489 | 4/1993 | Jacobs et al. . |
| 5,227,201 | 7/1993 | Harper . |
| 5,227,422 | 7/1993 | Mitsuji et al. . |
| 5,281,655 | 1/1994 | Mitsuji et al. . |
| 5,464,885 | 11/1995 | Craun . |
| 5,466,745 | 11/1995 | Fiori et al. . |
| 5,506,328 | 4/1996 | Chandalia et al. . |
| 5,508,340 | 4/1996 | Hart . |
| 5,554,671 | 9/1996 | Craun et al. . |
| 5,563,206 | 10/1996 | Eicken et al. . |
| 5,563,207 | 10/1996 | Brahm et al. . |
| 5,576,360 | 11/1996 | Craun et al. . |
| 5,576,361 | 11/1996 | Craun . |
| 5,623,046 | 4/1997 | Papalos et al. . |
| 5,648,518 | 7/1997 | Ritter et al. . |
| 5,654,038 | 8/1997 | Tuller et al. . |
| 5,670,599 | 9/1997 | Bassner . |
| 5,679,740 | 10/1997 | Heitner . |
| 5,688,560 | 11/1997 | Honda et al. . |
| 5,693,703 | 12/1997 | Hart . |
| 5,709,908 | 1/1998 | Gurney . |
| 5,712,363 | 1/1998 | Noomen et al. . |
| 5,767,188 | * 6/1998 | Kamikuri et al. ............ 524/507 |

OTHER PUBLICATIONS

Boudreaux et al. and Niroomand et al., "Waterborne 2K Acrylic Polyurethanes: Novel Low –NCO/–OH Systems", 1998, Presented at the Waterborne, Higher–Solids, and Powder Coatings Symposium, Feb. 18–20, 1998, New Orleans, LA.

* cited by examiner

*Primary Examiner*—Patrick D. Niland
(74) *Attorney, Agent, or Firm*—John E. Drach; Martin G. Meder; Michael P. Dilworth

(57) ABSTRACT

A method for formulating an aqueous dispersion of a polymer includes dissolving a polymer such as an acrylic polyol in a solvent to form a polymer solution. A surfactant is added to the polymer solution, and water is then added with mixing sufficient to dispersed the polymer in the water. The resulting aqueous dispersion can be mixed with a water dispersible polyisocyanate to produce coating materials which can be cured to form tough films and coatings.

22 Claims, 2 Drawing Sheets

AQUEOUS DISPERSIONS OF POLYMERS

CROSS REFERENCE TO RELATED APPLICATIONS

This application claims priority to U.S. Provisional application Ser. No. 60/042,357 filed on Mar. 25, 1997.

BACKGROUND OF THE INVENTION

1. Field of the Invention

Aqueous dispersions of polymeric compounds and their use in formulating water borne ambient cure coatings are described herein.

2. Background of the Related Art

Water-based polymeric systems are becoming increasingly important, especially in coating, adhesive, and ink applications due to environmental laws on restricted use of volatile organic compounds.

One type of coating widely used in the area of OEM (Original Equipment Manufacture) and refinish coatings are the two-component coatings based on acrylic polyols and polyisocyanates. These coatings are employed for ambient-cure or low-bake applications over metal, plastics, wood and a variety of other types of substrates. The conventional types of coatings based on acrylic polyols and polyisocyanates contain relatively large amounts of volatile organic compounds (VOCs) used as solvents.

High-solids coatings based on acrylic polyols and polyisocyanates have been developed in order to reduce the VOC levels of these types of coatings. The higher-solids coatings are desirable for their lower VOC content but have been found to suffer from a number of drawbacks such as difficulty in achieving balance of cure-speed and pot-life, good wetting of all types of substrates, inability to match the performance of conventional solvent-based coatings. Typical —NCO/—OH levels are greater than 1.5, which results in environmental and film property problems. Incorporation of ionic or hydrophilic sites on the polyurethane, use of surfactants in the acrylic polyol emulsion and dispersible polyisocyanate, and addition of other additives result in an increase in the water sensitivity of the coatings. Generation of microfoaming caused by the dispersion process, reaction of the isocyanate groups with water, or spray coating application can lead to a reduction in clarity, gloss, distinction of image (DOI), and pinholing in the final film. Another disadvantage with prior systems is that special high shear mixing equipment is commonly needed with aqueous two-component systems to prevent gel formation caused by incompatibility and viscosity differences of the acrylic emulsion and the dispersible polyisocyanate. Other disadvantages associated with waterborne two-component polyurethane systems are poor re-wetting characteristics, different rheology than solvent-borne two-component systems, pH sensitivity, and catalyst compatibility. Accordingly, there is a need to develop alternative low-VOC coatings based on acrylic polyols and polyisocyanates that do not exhibit the aforementioned disadvantages.

SUMMARY OF THE INVENTION

A method is provided herein for formulating an aqueous dispersion of a polymer such as an acrylic polyol, the method comprising the steps of: (a) dissolving the polymer in a solvent to form a viscous polymer solution; (b) adding a surfactant to the polymer solution; then (c) adding water to the polymer solution sufficient to form a dispersion of the water dispersible polymer in the water. By maintaining the maximum processible viscosity in the polymer solution, dispersions having small particle size can be prepared without the need for special high shear mixing equipment.

The aqueous dispersion thus formed may be combined with a water dispersible polyisocyanate to form coating fluids. Coating fluids derived from aqueous dispersions of acrylic polyols and polyisocyanates advantageously have low VOC content and can be cured to form hard dry films and coatings.

DETAILED DESCRIPTION OF THE INVENTION

Figure 1:
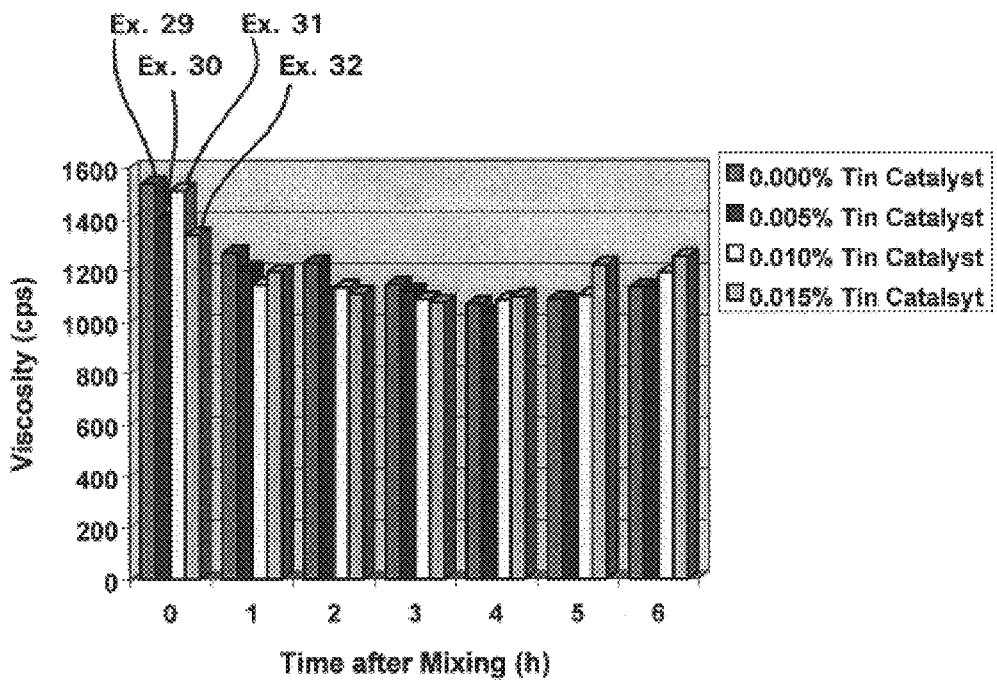
FIG. 1 is a graph showing the effects of tin catalyst levels and mixing time on the viscosity of coating formulations.

The process of the present invention is a low shear emulsification process for making an aqueous dispersion of a polymer. Such polymers can include polyamides, acrylic polyols, polyesters, and epoxies, for example. Although the process is described below with reference to acrylic polyols it will be understood that any hydrophobic polymer can be dispersed using the methods described herein. Note that all quantities appearing hereinafter shall be understood to be modified by the term "about", except in the examples and as indicated otherwise.

The preferred polymer is an acrylic polyol. More preferred is an acrylic polyol copolymer containing 5% to 50% by weight of an alkyl acrylate (e.g., methyl acrylate, ethyl acrylate, butyl acrylate), 5% to 50% by weight hydroxyalkyl acrylate (e.g., hydroxyethylacrylate), 5% to 50% by weight alkyl methacrylate (e.g., methyl methacrylate, ethyl methacrylate), and 5% to 50% by weight of a vinyl aromatic compound (e.g., styrene).

The aqueous dispersion can be made by dissolving the water dispersible polymer in the minimum amount of solvent, applying heat if necessary. Examples of suitable solvents include ethyl acetate, butyl acetate, ethylene glycol monomethyl ether acetate, ethylene glycol monoethyl ether acetate, methoxypropyl acetate, 2-butanone, cyclohexanone, acetone, toluene, methyl ethyl ketone (MEK), methyl amyl ketone, xylene or mixtures thereof Other solvents are also suitable, such as propylene glycol diacetate, diethylene glycol dimethyl ether, diethylene glycol ethyl ether acetate, diethylene glycol butyl ether acetate, N-methyl-pyrrolidone and N-methylcaprolactam, or mixtures of the solvents with each other or with the solvents mentioned above.

The amount of solvent added will depend on a number of factors including the molecular weight and chemical nature of the polymer chosen, the temperature employed and the specific solvent used. Generally, the amount of solvent employed should be the minimum amount necessary to provide a high viscosity polymer solution that can be readily processed by low shear stirring at temperatures below 100° C. Where the polymer chosen is a liquid at temperatures below 100° C. no solvent need be employed. In some instances where a solid, high molecular weight polymer is used up to 50% solvent or more may be required to provide a processable solution. The solution can have a viscosity in the range of from 10,000 cps to 1,000,000 cps, preferably, from 100,000 to 500,000 cps. Normally, in preparing solutions of acrylic polyols having the desired high viscosity, the proportion of organic solvent should not exceed 25% by weight, preferably 15% by weight, and more preferably 10% by weight based on the weight of the solution.

To reduce the amount of solvent employed, polymer and solvent can be raised to a temperature of up to 100°, more preferably less than 90° C., and most preferably between 70° C. and 85° C. to provide a stirrable solution of the polymer.

After the polymer has been sufficiently dissolved an emulsifying agent can be added to the polymer solution with mixing. The emulsifying agent is preferably a non-ionic, anionic, or cationic surfactant, or a mix surfactant or a phase inversion surfactant.

A variety of surfactants, anionic, cationic, non-ionic or amphoteric in character, may be employed. Among the well-known surfactants useful in the process of the present invention are the sorbitan esters of fatty acids having 10 to 22 carbon atoms; polyoxyethylene sorbitan esters of $C_{10}$ to $C_{22}$ fatty acids having up to 80% ethylene oxide; polyoxyethylene sorbitol esters of $C_{10}$ to $C_{22}$ fatty acids, polyoxyethylene derivatives of fatty phenols having 6 to 20 carbon atoms and up to 80% ethylene oxide; fatty amino and amido betaines having 10 to 22 carbon atoms; fatty alcohols of 5 to 16 carbon atoms, polyoxyethylene condensates of $C_{10}$ to $C_{22}$ fatty acids or fatty alcohols having up to 80% ethylene oxide; polyoxyethylene-polyoxypropylene block polymers; ionic surfactants such as the alkylaryl sulfonates of 6 to 20 carbons in the alkyl group; $C_{10}$ to $C_{22}$ fatty acid soaps; $C_{10}$ to $C_{22}$ fatty sulfates; $C_{10}$ to $C_{22}$ alkyl sulfonates; $C_{10}$ to $C_{22}$ fatty amine oxides; fatty imidazolines of $C_6$ to $C_{20}$ carbon atoms; fatty amido sulfobetaines having 20 to 22 carbon atoms; quaternary surfactants such as the fatty ammonium compounds having 10 to 22 carbon atoms; $C_{10}$ to $C_{22}$ fatty morpholine oxides, alkali metal salts of carboxylated ethoxylated $C_{10}$ to $C_{22}$ alcohols having up to 80% E.O., ethylene oxide condensates of $C_{10}$ to $C_{22}$ fatty acid monoesters of glycerins having up to 80% E.O. and the mono- or diethanol amides of $C_{10}$ to $C_{22}$ fatty acids, etc. As is well known in the field of surfactants, the counter ion in the case of anionic surfactants may be any of the alkali metals, ammonia, or substituted ammonias such as trimethylamine or triethanolamine. Usually ammonium, sodium and potassium are preferred. In the case of cationic surfactants, the counter ion is usually a halide, sulfate or methosulfate, the chlorides being the most common industrially available compounds. The foregoing compounds have been described with particular reference to fatty derivatives. It is the fatty moiety usually forming the lipophilic moiety. A common fatty group is an alkyl group of natural synthetic origin. In most instances, the alkyl group may be replaced by the corresponding ethylenically saturated group having one or more ethylene linkages such as commonly occur in nature. Common unsaturated groups are oleyl, linoleyl, decenyl, hexadecenyl, dodecenyl, etc. In appropriate cases, as known in the art, the alkyl group may be cyclic, i.e., cycloalkyls, or may be straight or branched chain.

Among the surfactants found particularly useful in accordance with the present invention are nonylphenol-polyoxyethylene condensates, the sorbitan and sorbital mono esters of $C_{12}$ to $C_{18}$ fatty acids, and their ethylene oxide condensates.

Other representative surfactants are: sorbitol monolaurate-ethylene oxide condensates; sorbitol monomyristate-ethylene oxide condensates; sorbitol monostearate-ethylene oxide condensates; dodecylphenol-ethylene oxide condensates; myristylphenol-ethylene oxide condensates; octylphenyl-ethylene oxide condensates; stearylphenol-ethylene oxide condensates; lauryl alcohol-ethylene oxide condensates; stearyl alcohol-ethylene oxide condensates; secondary alcohol-ethylene oxide condensates such as commercial $C_{14}$–$C_{15}$ secondary alcohols condensed with ethylene oxide (commercially available as "Tergitol"); decyl amino betaine; coco amino betaine; cetyl amino betaine; coco amido betaine; coco amido sulfobetaine; oleyl amido betaine, coco imidazoline; coco sulfoimidazoline, cetyl imidazoline, 1-hydroxyethyl-2-heptadecenyl imidazoline; 1-hydroxyethyl-2-mixed heptadecenyl heptadecadienyl imidazoline; n-coco morpholine oxide; decyl dimethyl amine oxide; coco amido dimethyl amine oxide; sorbitan tristearate condensed with ethylene oxide; sorbitan trioleate condensed with ethylene oxide; sorbitan trioleate; sodium or potassium dodecyl sulfate; sodium or potassium stearyl sulfate; sodium or potassium dodecyl benzene sulfonate; sodium or potassium stearyl sulfonate; triethanol amine salt of dodecyl sulfate; trimethyl dodecyl ammonium chloride; trimethyl stearyl ammonium methosulfate; polyoxyethylene/polyoxypropylene block polymers having 10%–80% ethylene oxide (by weight) and a molecular weight of 900 to 16,000; sodium laurate; sodium or potassium myristate; and sodium or potassium stearate.

The amount of surfactant employed should be the minimum amount necessary to emulsify the polymer solution in water. Normally, the ratio of surfactant weight to polymer weight should be in the range of from 0.2% to 20%, preferably 1% to 15%, and more preferably 2% to 10%.

Next, water is added with stirring to the polymer solution. The temperature of the polymer solution at the start of water addition can preferably be from ambient temperature to 90° C. The amount of water added and the temperature are adjusted to give a maximum viscosity of the internal phase (polymer/surfactant/ solvent) under normal stir rates (500–2000 rpm). As previously mentioned, one of the benefits of the present methods is that low-VOC dispersions and coating formulations can be prepared without the need for expensive, special high shear equipment, but rather can be prepared at relatively low temperatures using standard low shear lab equipment. The viscous internal phase is mixed until homogenous. Water is again added with stirring until the polymer disperses or until the desired percentage of solids is reached. The percentage of solids can range from 5 to 95 percent by weight, preferably 15 to 80 percent by weight, most preferably 25 to 65 percent by weight.

The solvent can be left in the dispersion, but preferably some or all of the solvent is removed by, for example, vacuum distillation. Particle sizes of the polymer lattices produced by the methods described herein can range from 0.1 to 2.0 microns, preferably from 0.3 to 1.0 microns.

Optionally, one or more compounds can be added to the polymer solution to neutralize any acid in the polyol and to facilitate water dispersibility. Suitable compounds include metal hydroxides and amines. The amines can be chosen from primary and secondary aliphatic, cycloaliphatic and aromatic amines, tertiary aliphatic and aromatic amines, alkanolamines, polyamines, oxyalkyleneanines, poly(oxyalkylene)diamines, and poly(oxyalkylene)triamines. For example, useful amines include: methylamine, ethylamine, propylamine, isopropylamine, cyclohexylamine, p-aminophenol, aniline, diethylamine, dipropylamine, di-isopropylamine, trimethylamine, triethylamine, tri-isopropylamine, ethanolamine, diethanolamine, triethanolamine, ethylene diamine, and hexamethylene diamine.

The acrylic polyol dispersion preferably has a hydroxyl equivalent weight (HEW) of from 200 to 1500, more preferably 600 to 900 as supplied. Most preferred is an acrylic polyol dispersion available from Henkel Corp. and designated as TSAX 13-680, which has a hydroxyl equivalent weight (HEW) of 890 as supplied at 62% solids by weight. The TSAX 13-680 dispersion contains no more than 0.8 lb/gal VOC and has a Brookfield viscosity of 16,000 cps at 25° C.

The aqueous dispersion can be a first component of a two or more component water-dispersible polymer mixture suitable for use as a curable coating material. For example, in a preferred combination the first component is an aqueous dispersion of acrylic polyol and the second component is a water dispersible polyisocyanate. Various water dispersible polyisocyanate compositions are disclosed in U.S. Pat. Nos. 5,563,207, 5,200,489, and 3,996,154, the disclosures of which are incorporated by reference herein.

Examples of polyisocyanates useful in the process of the present invention are those containing one or more of the following: biuret groups, isocyanurate groups (such as cyclotrimerized isocyanurate groups), uretidione groups, urethane groups, allophanate groups, and combinations thereof The polyisocyanate suitably has an average functionality of at least 2, preferably between 2.5 and 6, most preferably between 3 and 6. Suitable polyisocyanates include aliphatic polyisocyanates, aromatic polyisocyanates, and combinations thereof, but preferably at least some amount of an aliphatic polyisocyanate is employed in the process of the present invention. Polyisocyanates containing aliphatically and/or cycloaliphatically bound isocyanate groups are preferred for the production of light-stable coatings.

The polyisocyanates can be prepared by the known modification of simple organic diisocyanates, typically resulting in the formation of biuret, uretidione, isocyanurate, urethane or allophanate groups, or the simultaneous formation of various of these groups. Any excess of unmodified monomeric starting diisocyanate still present after the modification reaction is suitably removed in a known manner, such as distillation preferably using wiped-film evaporation, to provide a polyisocyanate that is essentially free of volatile diisocyanate. The term "essentially free of volatile diisocyanate" as used herein is intended to designate that the polyisocyanate contains no greater than 0.7%, preferably no greater than 0.5%, most preferably no greater than 0.2%, by weight of volatile diisocyanate based upon the weight of the polyisocyanate. Additionally, if the polyisocyanate is provided in a solvent, the amount of VOC in the polyisocyanate is preferably below 2.0 lb./gal, must preferably below 1.0 lb./gal.

Diisocyanates suitable for use in the preparation of the polyisocyanates include, for example, 2,4- and/or 2,6 diisocyanatotoluene, 4,4'-diisocyanatodicyclohexylmethane, hexamethylene diisocyanate ("HDI"), 1-isocyanato-3,3,5-trimethyl-5-isocyanatomethyl-cyclohexane ("IPDI"), 1,4-butanediisocyanate, 1-methyl-2,4-diisocyanatocyclohexane, 1-methyl-2,6-diisocyanatocyclohexane, 4,4'-methylene-bis-(cyclohexyl isocyanate), 2-methyl-1,5-diisocyanatopentane, 2-ethyl-1,4-diisocyanatobutane, 2,4,4-trimethylhexamethylene-1,6-diisocyanate, α,α'-diisocyanato-1,3-dimethylbenzene, α,α'-diisocyanato-1,3-dimethylcyclohexane, α,α'-diisocyanato-1,4-dimethylbenzene, α,α'-diisocyanato-1,4-dimethylcyclohexane, 1,3-diisocyanatocyclohexane and 1,4 diisocyanatocyclohexane. The polyisocyanates may also be suitably prepared from mixtures of these, or other, polyisocyanates, and mixtures of a polyisocyanate with a non-volatile isocyanate, such as octadecyl-isocyanate, are also suitable for use within the scope of the present invention. Preferably, aliphatic or cycloaliphatic diisocyanates are utilized as starting materials for preparing the polyisocyanates. Preferred aliphatic polyisocyanates are those derived from 1,6-hexamethylene diisocyanate such as those under the designation XWHDT (available from Rhone-Poulenc) or BAYHYDUR™ XP7063 (available from Bayer). The XWHDT polyisocyanate is derived from a hydrophilic modified hexamethylene diisocyanate trimer and has an isocyanate equivalent weight (IEW) of 250 as supplied at 90% solids by weight. The material contains 0.9 lb/gal VOC content and has a Brookfield viscosity of 1,200 cps at 25° C.

Coating fluids can be made by mixing a first component containing an aqueous dispersion of an acrylic polyol, and optional ingredients such as a catalyst, flow modifier, defoamer, and a cosolvent and/or additional water, and a second component containing a water dispersible polyisocyanate, and optionally a solvent or diluent.

The catalyst can be a conventional catalyst to accelerate the reaction between the isocyanate component and the acrylic component, such as for example, dibutyl tin dilaurate, dibutyl tin diacetate, stannous octoate, zinc octoate or zinc carboxylate, and may be present in the formulation in amounts ranging from 0% to 0.10% by weight of catalyst.

Typical cosolvents include acetate solvents such as, for example, $C_6$–$C_{13}$ alkyl acetates, propylene glycol monomethyl ether acetate, dipropylene glycol monomethyl ether acetate, tridecyl acetate ester, and the like. Ketone solvents such as, for example, $C_{19}$–$C_{15}$ ketones can also be chosen as the cosolvent. Preferred cosolvents are available under the trade name EXXATE from Exxon Chemicals and TEXANOL from Eastman Chemical Company. The percentage of cosolvent can range from 0% to 20%, preferably 1% to 10%, and more preferably 3% to 7% based on total mixture weight. The percentage of water can range from 5% to 50%, preferably 10% to 40%, and more preferably 25% to 35% based on total mixture weight.

The following examples illustrate the method for making aqueous dispersions. Suitable equipment for making the aqueous dispersions set forth in the examples include a reaction kettle, a four-neck top, a stirrer, condenser, heating mantle, thermocouple, fluid metering pump or other suitable fluid addition device, and conventional means to control temperature.

The viscosities of the formulations were measured by a Brookfield viscometer. Particle sizes of the acrylic polyol dispersions and clearcoat formulations were measured by a Malvern Particle Analyzer. Panels were tested for Persoz pendulum hardness, pencil hardness, tack free and through-cure times, direct and reverse impact, DOI, 20° and 60° gloss, Conical Mandrel, methyl ethyl ketone (MEK) double rubs, gloss retention, and chemical resistance (10% sodium hydroxide (NaOH), 10% hydrochloric acid (HCl), 10% sulfuric acid ($H_2SO_4$), 10% acetic acid, xylene, methyl ethyl ketone (MEK), ethanol, gasoline, and Skydrol 500B). All testing was done in accordance with ASTM procedures.

EXAMPLE 1

The reactor was charged with 402 g of an acrylic polyol copolymer comprising approximately 19% butyl acrylate, 23% hydroxyethylacrylate, 35% methyl methacrylate and 23% styrene, about 70% solids in methyl amyl ketone, available as G-CURE 108A70 (TM Henkel Corp., Ambler, Pa.) and 106 g of volatiles were removed by distillation. Butyl acetate (33 g) was added as a solvent and allowed to mix at 81° C. 21.5 g of a nonylphenol ethoxylate EO=30, a phase inversion surfactant, and 70 drops of triethylamine were added and mixed at 81° C. Deionized water, 50 g was added and mixed by stirring. Temperature at the start of water addition was 65° C. and at the end of water addition was 43° C. A second portion of water, 80 g was added and mixed by stirring. Temperature at the start of water addition was 43° C. and at the end of this water addition was 34° C. The dispersion of acrylic polyols resin obtained in this manner had a mean particle size of 0.9 microns, solids content of 65%, viscosity of 5,500 cPoise (spindle #4 at 60 RPM) and a pH of 7.9 (at 10% solids).

EXAMPLE 2

The reactor was charged with 3000 g of an acrylic polyol copolymer comprising approximately 25% butyl acrylate, 25% hydroxyethylacrylate, 37% methyl methacrylate and 13% styrene, about 77% solids in methyl amyl ketone or butyl acetate, available as G-CURE 110A77 and 110BL77 respectively (TM Henkel Corp., Ambler, Pa.). Vacuum distillation was used to remove 570 g volatiles. Nonylphenol ethoxylate EO=30, 169 g; butyl acetate, 78 g; and triethylamine, 7.3 g; were added and mixed by stirring at 75° C. Deionized water, 1,144 g was added in three portions (173 g, 173 g and 798 g with stirring). The dispersion obtained had a mean particle size of 1 microns, 63.4% solids, a viscosity of 9,200 cPoise (RV #6 at 20 RPM) and a pH of 6.3 (at 10% solids).

EXAMPLE 3

Another dispersion was made of the acrylic polyol of example 2 using a procedure similar to the one given in Example 2 from 3,000 g of acrylic polyol, 182 g of an ethoxylated castor oil EO=200, 78 g butyl acetate, 7.3 g triethylamine and 1,160 g deionized water. The dispersion obtained had a mean particle size of 2.2 microns, 67.7% solids, viscosity of 265,000 cPoise (RV #6 at 0.6 RPM) and pH 8.1 (10% solids).

EXAMPLE 4

A dispersion was prepared using a procedure similar to the one used in example 2 from 300 g of an acrylic polyol copolymer comprising approximately 10% butyl acrylate, 33% hydroxyethylacrylate, 29% methyl methacrylate and 29% styrene, about 75% solids in methyl amyl ketone, available as G-CURE 109A75 (TM Henkel Corp., Ambler, Pa.), 5.6 g PLURONIC L44 (an ethylene oxidepropylene oxide copolymer nonionic surfactant, TM BASF Performance Chemicals), 8.0 g of a nonylphenol ethoxylate EO=30, 22 g butyl acetate, 45 drops triethylamine and 116 g deionized water. The dispersion had a mean particle size of 21.8 microns, viscosity of 1,450 cPoise (RV #6 at 20 RPM), 63.4% solids and pH of 6.5 (10% solids).

EXAMPLES 5 to 28

Clear coatings were formulated by mixing the aqueous dispersions of acrylic polyols from Examples 1 to 4 with water dispersible polyisocyanates, tin catalyst, cosolvent, and water. The formulated coatings were drawn down over suitable substrates using wire-wound bars and cured by drying to obtain dry films having a thickness of from about 1 to 2 mils. The combinations of acrylic polyol dispersion and polyisocyanate as well as the ratio of acrylic polyol to polyisocyanate and weight percent catalyst used in Examples 5 to 28 are set forth in Table I below. The properties of the resulting coatings are given in Table II below. All of the samples satisfactorily passed a 24 hr. water spot test.

TABLE I

| Example | Acrylic Polyol Dispersion | Polyisocyanate | Ratio | % Catalyst |
|---|---|---|---|---|
| 5 | Example 1 | Bayhydur | 1:1.2 | 0.15 |
| 6 | Example 1 | Bayhydur | 1:1.5 | 0.12 |
| 7 | Example 1 | Bayhydur | 1:1.8 | 0.10 |
| 8 | Example 2 | Bayhydur | 1:1.2 | 0.16 |
| 9 | Example 2 | Bayhydur | 1:1.5 | 0.18 |
| 10 | Example 2 | Bayhydur | 1:1.8 | 0.16 |
| 11 | Example 3 | Bayhydur | 1:1.2 | 0.16 |
| 12 | Example 3 | Bayhydur | 1:1.5 | 0.24 |
| 13 | Example 3 | Bayhydur | 1:1.8 | 0.16 |
| 14 | Example 4 | Bayhydur | 1:1.2 | 0.11 |
| 15 | Example 4 | Bayhydur | 1:1.5 | 0.04 |
| 16 | Example 4 | Bayhydur | 1:1.8 | 0.02 |
| 17 | Example 1 | XWHDT | 1:1.2 | 0.12 |
| 18 | Example 1 | XWHDT | 1:1.5 | 0.06 |
| 19 | Example 1 | XWHDT | 1:1.8 | 0.06 |
| 20 | Example 2 | XWHDT | 1:1.2 | 0.18 |
| 21 | Example 2 | XWHDT | 1:1.5 | 0.16 |
| 22 | Example 2 | XWHDT | 1:1.8 | 0.10 |
| 23 | Example 3 | XWHDT | 1:1.2 | 0.09 |
| 24 | Example 3 | XWHDT | 1:1.5 | 0.10 |
| 25 | Example 3 | XWHDT | 1:1.8 | 0.08 |
| 26 | Example 4 | XWHDT | 1:1.2 | 0.075 |
| 27 | Example 4 | XWHDT | 1:1.5 | 0.072 |
| 28 | Example 4 | XWHDT | 1:1.8 | 0.06 |

TABLE 2

| Example | Tack Free Time (Hr.) | Pot Life (Hr.) | 1 Mo. 20/60 Gloss | 1 Mo. Pend. Hardness (sec) | 1 wk MEK 100 DBL Rubs |
|---|---|---|---|---|---|
| 5 | 1 | >2 | 65/97 (105/117) | 112 (78) | Pass |
| 6 | 2.5 | <1 | 69/103 (104/116) | 108 (116) | Pass |
| 7 | 1.5 | <1.5 | 75/103 (86/105) | 122 (151) | Pass |
| 8 | 3 | >4 | 91/111 (89/103) | 53 (84) | Pass |
| 9 | 1 | <1 | 75/101 (102/114) | 38 (39) | Pass |
| 10 | >4 | 2 | 96/112 (94/111) | 59 (69) | Pass |
| 11 | 3 | >4 | 83/105 (89/103) | 38 (84) | Pass |
| 12 | 1 | 3 | 78/106 (102/114) | 59 (39) | Pass |
| 13 | 2 | >4 | 55/96 (94/111) | 64 (69) | Pass |
| 14 | 1 | 1 | 84/101 (103/117) | 59 (63) | Pass |
| 15 | 3.5 | 2 | 84/108 (94/113) 24 hr. | 118 (141) | Pass |
| 16 | >3 | <2 | 51/94 (105/116) 24 hr. | 132 (99) | Pass |
| 17 | 1 | 1 | 37/91 (87/102) | 160 (112) | Pass |
| 18 | 1 | 1 | 76/108 (91/106) | 127 (168) | Pass |
| 19 | 1 | 1 | 64/101 (94/105) | 164 (154) | — |
| 20 | 1.5 | 2 | 51/111 (83/101) | 95 (57) | Pass |
| 21 | 1.5 | 1.5 | 95/113 (98/116) | 99 (102) | Pass |
| 22 | 2.5 | 1 | 66/110 (91/104) | 134 (111) | Pass |
| 23 | 1 | 1 | 94/115 (83/101) | 137 (57) | Pass |
| 24 | 2.5 | 1 | 57/112 (98/116) | 139 (102) | Pass |
| 25 | 2 | 1 | 79/112 (95/106) | 123 (111) | Pass |
| 26 | 2 | 2 | 46/92 (103/115) | 126 (203) | Fail (Pass) |
| 27 | 2 | 2 | 40/92 (100/113) | 179 (137) | Fail (Pass) |
| 28 | 2 | 2 | 46/87 (88/112) | 69 (174) | Fail (Pass) |

(Control data in parentheses)

EXAMPLES 29 to 36

A first component of a two-component water-borne coating fluid was prepared by mixing acrylic polyol dispersion TSAX 13-680 (available from Henkel Corp.) with deionized water, tin catalyst (FASCAT™ 4224 available from Elf Atochem North America), NOPCO® DSX 1550 (a flow modifier/defoamer available from Henkel Corp.), and PERENOL® S-5 (a flow modifier/defoamer available from Henkel Corp.).

A second component was prepared by mixing XWHDT polyisocyanate and a diluent EXXATE 700 (available from Exxon Chemicals) with mechanical agitation. The amounts of the components in parts by weight are given in Table 3 (Examples 29 to 32) and Table 4 (Examples 33 to 36).

In Examples 29 to 32 the ratio of polyisocyanate to polyol was kept constant such that the —NCO/—OH ratio was 1.2, but the amount of catalyst was varied as follows:

| Example | Parts by Weight of Catalyst |
|---|---|
| 29 | 0.000% |
| 30 | 0.005% |
| 31 | 0.010% |
| 32 | 0.015% |

In Examples 33 to 36 the amount of catalyst was held constant, but the ratio of polyisocyanate to acrylic polyol was adjusted to give —NCO/—OH ratios as follows:

| Example | —NCO/—OH Ratio |
|---|---|
| 33 | 1.0 |
| 34 | 1.2 |
| 35 | 1.4 |
| 36 | 1.6 |

The two components were mixed together and stirred by hand for five minutes before application to the substrate. Films were prepared by draw-down (3–4 mil wet) on B-1000 iron-phosphate treated cold-rolled steel panels. Coatings with different —NCO/—OH indexings were cured at 23° C.±1 and 50%±5% relative humidity for 7 days. Coatings with varied tin catalyst levels were cured under ambient conditions for 7 days.

The effects of tin catalyst levels on physical properties were determined on films cured for 7 days under ambient conditions. The results of the testing are shown in Table 5 Examples 29 to 32) and Table 6 (Examples 33 to 36).

TABLE 3

Waterborne two-component acrylic/urethane clearcoats with varied tin catalyst levels

| Composition | Suppliers | Parts by Weight % | | | |
|---|---|---|---|---|---|
| Tin level (based on solids) | | 0.000% | 0.005% | 0.010% | 0.015% |
| Component I | | | | | |
| TSAX 13-680 | Henkel Corporation | 46.1 | 46.1 | 46.0 | 45.9 |
| d.i. water | | 32.7 | 32.5 | 32.4 | 32.4 |
| Fascat 4224 (1% in butyl acetate) | Elf Atochem North America | 0.00 | 0.21 | 0.42 | 0.63 |
| Nopco ® DSX 1550 | Henkel Corporation | 0.62 | 0.62 | 0.61 | 0.61 |
| Perenol ® S-5 | Henkel Corporation | 0.27 | 0.27 | 0.27 | 0.26 |
| Component II | | | | | |
| XWHDT | Rhodia Inc. | 15.4 | 15.4 | 15.4 | 15.3 |
| Exxate 700 | Exxon Chemicals | 4.9 | 4.9 | 4.9 | 4.9 |

Solids Weight % - 42.29;
Solids Volume % - 38.02;
VOC (lb/gal) - 0.96;
VOC (gram/liter) - 115;
Density Combined (lb/gal) - 8.73;
NCO:OH Ratio 1.2:1

TABLE 4

Waterborne two-component acrylic/urethane clearcoats with varied —NCO/—OH ratios

| Composition | Suppliers | Parts by Weight % | | | |
|---|---|---|---|---|---|
| NCO:OH Ratios | | 1.0 | 1.2 | 1.4 | 1.6 |
| Component I | | | | | |
| TSAX 13-680 | Henkel Corporation | 47.6 | 45.0 | 42.6 | 40.4 |
| d.i. water | | 32.2 | 33.0 | 33.6 | 34.2 |
| Fascat 4224 (1% in butyl acetate) | Elf Atochem North America | 0.21 | 0.21 | 0.21 | 0.21 |
| Nopco ® DSX 1550 | Henkel Corporation | 0.63 | 0.63 | 0.63 | 0.63 |
| Perenol ® S-5 | Henkel Corporation | 0.27 | 0.27 | 0.27 | 0.27 |
| Component II | | | | | |
| XWHDT | Rhodia Inc. | 13.8 | 15.6 | 17.3 | 18.7 |
| Exxate 700 | Exxon Chemicals | 5.3 | 5.3 | 5.4 | 5.6 |

Solids Weight % - 42.29;
Solids Volume % - 38.02;
VOC (lb/gal) - 0.93–0.95;
VOC (gram/liter) - 111–114;
Density Combined (lb/gal) - 8.73;
Tin level (based on solids) - 0.005%

TABLE 5

Coating properties of acrylic/urethane clearcoats with varied tin catalyst levels

| | Tin Level (based on solids) | | | |
|---|---|---|---|---|
| Test Methods[1] | 0.000% | 0.005% | 0.010% | 0.015% |
| DRY TIMES @ ambient conditions | | | | |
| Tack Free (h) | 13 | 4 | 3 | 2 |
| Through Cure (h) | >24 | 24 | 16 | 15 |
| OPTICAL PROPERTIES | | | | |
| 20° Gloss | 95 | 98 | 97 | 98 |
| 60° Gloss | 108 | 110 | 110 | 111 |
| DOI | 90 | 90 | 90 | 80 |
| IMPACT RESISTANCE | | | | |
| Direct (in-lb) | >160 | >160 | >160 | >160 |
| Reverse (in-lb) | >160 | >160 | >160 | >160 |
| FLEXIBILITY | | | | |
| Conical Mandrel (0.125 in) | pass | pass | pass | pass |
| HARDNESS | | | | |
| Pencil | H | H | H | H |
| Persoz Pendulum (s) | 224 | 221 | 198 | 195 |
| SOLVENT RESISTANCE | | | | |
| MEK | 200+ | 200+ | 200+ | 200+ |
| CHEMICAL RESISTANCE | | | | |
| Acid, 10% HCl Spot (24 hours) | pass | pass | pass | pass |
| Acid, 10% Acetic Acid Spot (24 hours) | blister | blister | blister | blister |
| Acid, 10% $H_2SO_4$ Spot (24 hours) | pass | pass | pass | pass |
| Base, 10% NaOH Spot (24 hours) | pass | pass | pass | pass |
| Hydrocarbon, Xylene Spot (24 hours) | mark | mark | mark | mark |
| Hydrocarbon, MEK Spot (24 hours) | mark | mark | mark | mark |
| Hydrocarbon, Ethanol Spot (24 hours) | pass | pass | pass | pass |
| Hydrocarbon, Gasoline Spot (24 hours) | pass | pass | pass | pass |
| Hydrocarbon, Skydrol 500B Spot (24 hours) | soft | soft | soft | soft |

[1]film thickness = 1.6 ± 0.1 mil

TABLE 6

Coating properties of acrylic/urethane clearcoats with varied —NCO/—OH ratios

| | —NCO/—OH Ratios | | | |
|---|---|---|---|---|
| Test Methods[1] | 1.0 | 1.2 | 1.4 | 1.6 |
| DRY TIMES @ 20° C./50% RH | | | | |
| Tack Free (h) | 6 | 6 | 6 | 6 |
| Through Cure (h) | 24 | 24 | 24 | 24 |
| OPTICAL PROPERTIES | | | | |
| 20° Gloss | 81.9 | 75.4 | 78.0 | 81.4 |
| 60° Gloss | 94.5 | 93.2 | 92.4 | 93.4 |
| DOI | 80 | 80 | 80 | 80 |
| IMPACT RESISTANCE | | | | |
| Direct (in-lb) | >160 | >160 | >160 | >160 |
| Reverse (in-lb) | 140 | 144 | 140 | 140 |
| FLEXIBILITY | | | | |
| Conical Mandrel (0.125 in) | pass | pass | pass | pass |
| HARDNESS | | | | |
| Pencil | H | H | H | H |
| Persoz Pendulum (s) | 214 | 231 | 250 | 255 |
| SOLVENT RESISTANCE | | | | |
| MEK | 200+ | 200+ | 200+ | 200+ |

TABLE 6-continued

Coating properties of acrylic/urethane clearcoats with varied —NCO/—OH ratios

| | —NCO/—OH Ratios | | | |
|---|---|---|---|---|
| Test Methods[1] | 1.0 | 1.2 | 1.4 | 1.6 |
| CHEMICAL RESISTANCE | | | | |
| Acid, 10% HCl Spot (24 hours) | blister | blister | blister | pass |
| Acid, 10% Acetic Acid Spot (24 hours) | blister | blister | blister | blister |
| Acid, 10% $H_2SO_4$ Spot (24 hours) | pass | pass | pass | pass |
| Base, 10% NaOH Spot (24 hours) | mark | mark | mark | pass |
| Hydrocarbon, Xylene Spot (24 hours) | mark | pass | pass | pass |
| Hydrocarbon, MEK Spot (24 hours) | mark | mark | pass | pass |
| Hydrocarbon, Ethanol Spot (24 hours) | pass | pass | pass | pass |
| Hydrocarbon, Gasoline Spot (24 hours) | pass | pass | pass | pass |
| Hydrocarbon, Skydrol 500B Spot (24 hours) | soft | soft | soft | soft |

[1]film thickness = 1.3 ± 0.1 mil

Figure 2:
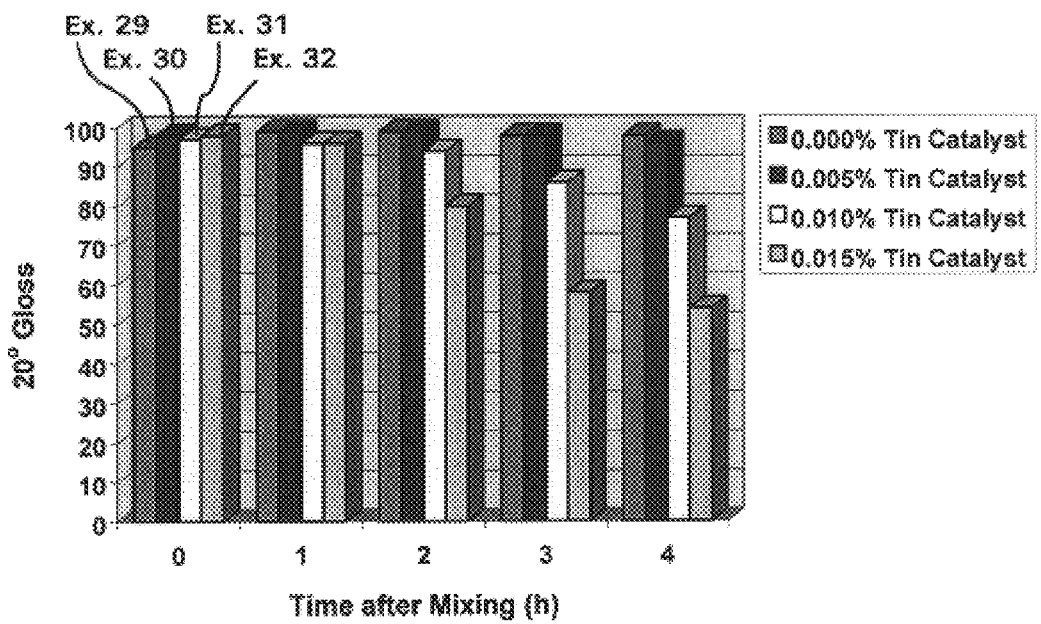
FIG. 2 is a graph showing the effects of tin catalyst levels and mixing time on 20° gloss of coatings.

Unlike solvent-borne two-component systems, increases in viscosity or gellation could not be used to determine the pot-life of waterborne two-component acrylic/urethane coatings because there was no significant viscosity change of the formulations over 4 hours after initial mixing. See, FIG. 1 which shows the viscosity for the formulations of each of Examples 29, 30, 31 and 32 at one hour intervals from zero to six hours. Therefore, the useable pot-life for coatings at different concentrations of tin catalyst was determined by 20° and 60° gloss. FIG. 2 shows the 20° gloss for coatings made from the formulations of each of Examples 29, 30, 31 and 32 at one hour intervals from zero to four hours. As shown in FIG. 2, increasing tin catalyst concentrations decreased the 20° gloss after 2 hours for coatings with higher tin catalyst levels (0.010 and 0.015%), thereby decreasing the useable pot-life of the formulation. Coatings formulated with 0 and 0.005% catalyst exhibited no significant changes in 20° and 60° gloss when applied 4 hours after mixing the two components.

As shown in Table 5, changes in tack free and through cure times of coatings were dependent upon the level of tin catalysts. Increased levels of catalyst significantly decreased tack free and through cure times by a factor of 6 and 2, respectively. The physical properties of the coatings were consistent with good flexibility and hardness on B-1000 iron-phosphate treated cold-rolled steel panels. The physical properties of the coatings were independent of the tin catalyst levels from which it was concluded that a high degree of crosslinking in the coatings was achieved before the end of the cure period (7 days). The flexibility of all coatings measured by conical mandrel passed 0.125 inch bend. Coatings based on formulations in Table 3 achieved greater than 160 in-lb for direct and reverse impact resistance and H for pencil hardness at 7 days of cure under ambient conditions.

The coatings had good resistance to a number of solvents including inorganic acids and hydrocarbons at 7 days of cure under ambient conditions. Coatings with and without tin catalyst achieved greater than 200 MEK double rubs. Extended environmental exposure studies of these coatings are in progress and will be reported at a later date.

The effects of systematic variations of —NCO/—OH ratios on the physical properties of coatings cured at 23 ° C.±1 and 50%±5% relative humidity for 7 days were measured. The —NCO/—OH indexing was varied at four different ratios, 1.0, 1.2, 1.4, and 1.6, while keeping the tin catalyst level at 0.005% based on solids. Table 6 lists the test methods and physical properties of the waterborne two-component acrylic polyurethane clear coatings with the varied —NCO/—OH ratios.

Figure 3:
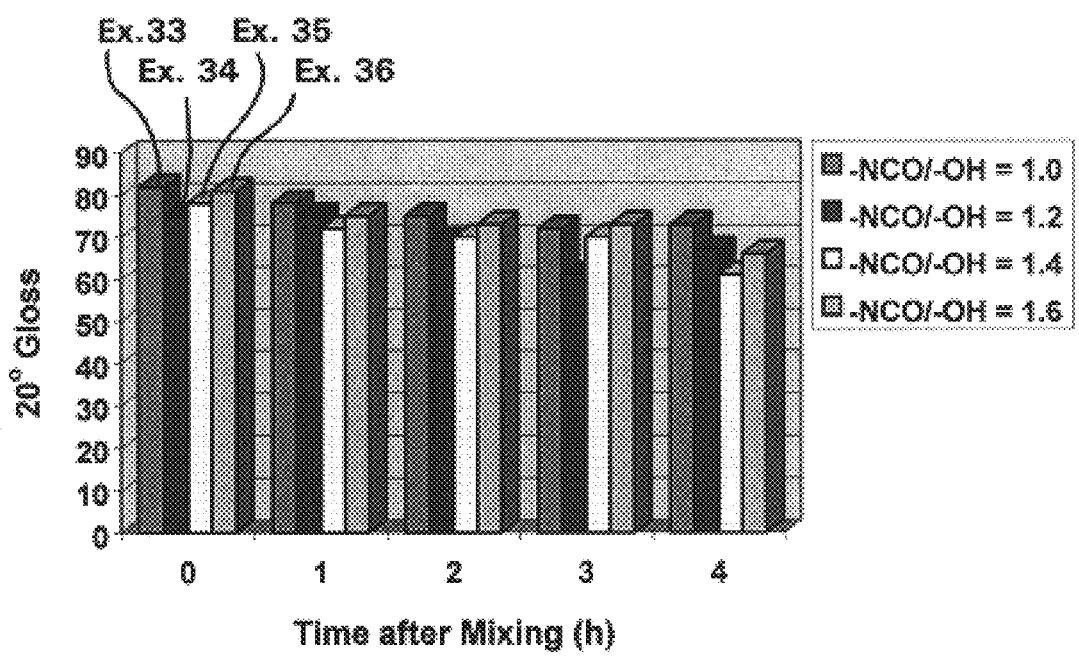
FIG. 3 is a graph showing the effects of —NCO/—OH ratios and mixing time on 20° gloss of coatings.

Waterborne two-component acrylic polyol/urethane coatings based on formulations in Table 4 showed no viscosity change during the usable pot-life. The 20° and 60° gloss of the clearcoats were measured over a four hour period to determine the pot-life. The 20° gloss of the coatings with higher —NCO/—OH ratios decreased faster as a function of time as demonstrated by FIG. 3 which shows 20° gloss for coatings made from the formulations of each of Examples 33, 34, 35 and 36 at one hour intervals from zero to four hours.

Figure 4:
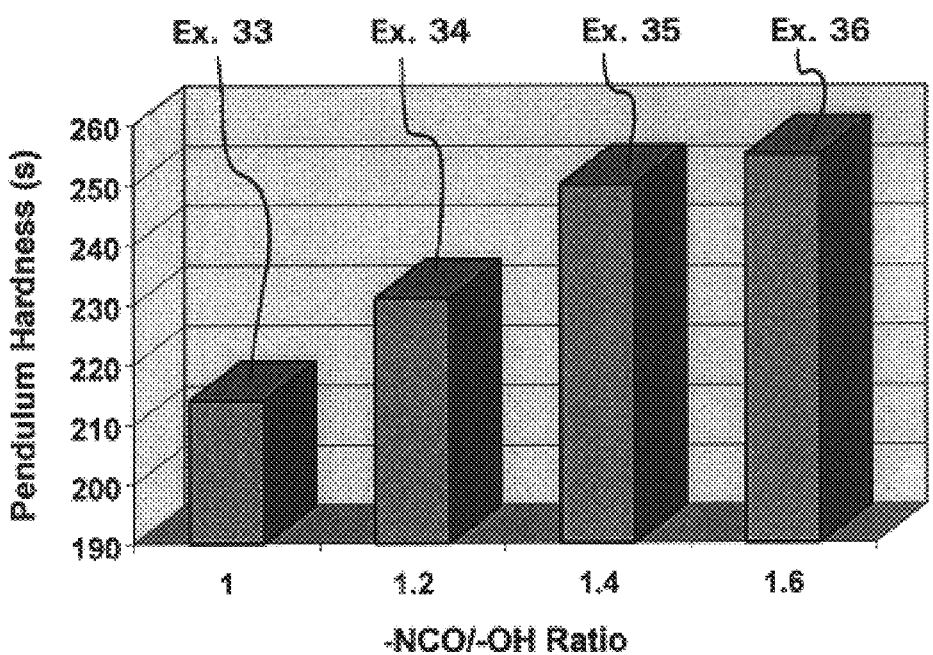
FIG. 4 is a graph showing the effects of —NCO/—OH ratios on Persoz Pendulum hardness of coatings.

Tack free and through cure times of coatings were independent of the —NCO/—OH ratios (Table 6). Physical properties of coatings listed in Table 6 were indicative of good hardness and flexibility. The pendulum hardness of the films of Examples 33, 34, 35 and 36 increased with increasing polyisocyanate crosslinker concentration (FIG. 4). Coatings based on formulations in Table 4 achieved a pencil hardness of H at the curing period. In addition, all the coatings had a direct impact resistance greater than 160 in-lb and a reverse impact resistance of about 140 in-lb.

All of the films exhibited MEK double rubs greater than 200, regardless of the —NCO/—OH ratio. This was indicative of a high degree of crosslinking between hydroxyl and isocyanate functionalities at all ratios. These coatings had good resistance to a number of chemical agents, and chemical resistance was improved at higher NCO amounts (Table 6).

Formulations of acrylic polyol dispersions and a water dispersible polyisocyanate were developed that produced useful coatings, even at —NCO/—OH ratios less than 1.25. The TSAX 13-680 and XWHDT two-component system yielded coatings with excellent physical properties at low shear mixing (hand mixing). Usable pot-life of the formulations was monitored by 20° and 60° gloss since no definitive viscosity change was seen after 6 hours. The effects of tin catalyst levels on coating properties were determined by varying the catalyst amount while keeping the —NCO/—OH ratio constant. The physical properties of coatings cured for 7 days under ambient conditions were independent of catalyst levels. This was attributed to a high degree of crosslinking in the films before the end of the cure period. However, dry times of the coatings were directly proportional to the tin catalyst concentration. Faster tack free and through cure times were achieved at higher tin catalyst concentrations but the usable pot-life as measured by 20° and 60° gloss was significantly decreased. The effects of polyisocyanate crosslinker concentration on film properties were investigated by changing the —NCO/—OH ratios while keeping the catalyst level constant. In general, the physical properties of the coatings cured for 7 days at 23° C. and 50% RH were independent of —NCO levels, except for Persoz hardness which increased at higher amounts of —NCO. Thus coatings with good physical properties could be achieved at low —NCO/—OH ratios from the TSAX 13-680 and Tolonate XWHDT two-component system.

EXAMPLE 37

The reactor was charged with 402 g of an acrylic polyol copolymer comprising approximately 19% butyl acrylate, 23% hydroxyethylacrylate, 35% methyl methacrylate and 23% styrene, about 70% solids in methyl amyl ketone, available as G-CURE 108A70 (TM Henkel Corp., Ambler, Pa.) and 115 g of volatiles were removed by distillation. Butyl acetate (33 g) was added as a solvent and allowed to mix at 81° C. 16.8 g of a nonylphenol ethoxylate EO=30, and 5.8 g Pluronic L61 a phase inversion surfactant, and 1.0 g N, N-dimethanolamine were added and mixed at 81° C. Deionized water, 50 g was added and mixed by stirring. Temperature at the start of water addition was 65° C. and at the end of water addition was 43 ° C. A second portion of water, 80 g was added and mixed by stirring. Temperature at the start of water addition was 43° C. and at the end of this water addition was 34° C. The dispersion of acrylic polyols resin obtained in this manner had a mean particle size of 0.9 microns, solids content of 65%, viscosity of 16,000 cpoise (spindle #4 at 60 RPM) and a pH of 7.0 (at 10% solids).

EXAMPLE 38

A dispersion was prepared using a procedure similar to the one used in example 2 from 300 g of an acrylic polyol copolymer comprising approximately 10% butyl acrylate, 33% hydroxyethylacrylate, 29% methyl methacrylate and 29% styrene, about 75% solids in methyl amyl ketone, available as G-CURE 109A75 (TM Henkel Corp., Ambler, Pa.), 5.6 g PLURONIC L61 (an ethylene oxidepropylene oxide copolymer nonionic surfactant, TM BASF Performance Chemicals), 16.8 g of a nonylphenol ethoxylate EO=30, 33 g butyl acetate, 1.0 g N,N-dimethylethanolamine and 120 g deionized water. The dispersion had a mean particle size of 21.8 microns, viscosity of 16,000 cPoise RV #6 at 20 RPM), 63.4% solids and pH of 6.5 (10% solids).

While the present invention has been described and exemplified above in terms of certain preferred embodiments, various other embodiments may be apparent to those skilled in the art. Accordingly, the invention is not limited to the embodiments specifically described and exemplified, but variations and modifications may be made therein and thereto without departing from the spirit of the invention, the full scope of which is delineated by the following claims.

What is claimed is:

1. A method for formulating an aqueous dispersion of polymer comprising the steps of:
    a) providing a polymer solution containing hydrophobic acrylic polyol dissolved in a solvent, said hydrophobic acrylic polyol containing 5% to 50% by weight of an alkyl acrylate, 5% to 50% by weight hydroxyalkyl acrylate, 5% to 50% by weight alkyl methacrylate, and 5% to 50% by weight of vinyl aromatic compound;
    b) adding a surfactant selected from the group consisting of anionic, cationic, non-ionic and amphoteric surfactants to the polymer solution; and
    c) adding water to the polymer solution sufficient to form a dispersion of the polymer in the water.

2. A method for making a coating composition comprising the steps of:
    a) providing a polymer solution containing hydrophobic acrylic polyol dissolved in a solvent, said hydrophobic acrylic polyol containing 5% to 50% by weight of an alkyl acrylate, 5% to 50% by weight hydroxyalkyl acrylate, 5% to 50% by weight alkyl methacrylate, and 5% to 50% by weight of vinyl aromatic compound;
    b) adding a surfactant selected from the group consisting of anionic, cationic, non-ionic and amphoteric surfactants to the polymer solution;
    c) adding water to the polymer solution sufficient to form a dispersion of the polymer in the water; and
    d) combining the aqueous dispersion of acrylic polyol with a water dispersible polyisocyanate to form a coating composition.

3. The method of claim 1 wherein the step of dissolving the acrylic polyol is conducted by mixing the polymer in the solvent at an elevated temperature.

4. The method of claim 3 wherein the elevated temperature is up to about 100° C.

5. The method of claim 1 wherein the solvent is selected from the group consisting of ethyl acetate, butyl acetate, ethylene glycol monomethyl ether acetate, ethylene glycol monoethyl ether acetate, methoxypropyl acetate, 2-butanone, cyclohexanone, acetone, toluene, xylene, propylene glycol diacetate, diethylene glycol dimethyl ether, diethylene glycol ethyl ether acetate, diethylene glycol butyl ether acetate, N-methyl-pyrrolidone and N-methylcaprolactam and mixtures thereof.

6. The method of claim 1 further including the step of removing at least some of the solvent from the dispersion.

7. The method of claim 1 wherein the surfactant is selected from the group consisting of nonylphenol ethoxylate, ethyleneoxide-propyleneoxide copolymer and mixtures thereof.

8. The method of claim 1 further including the step of adding a neutralizing compound to the polymer solution.

9. The method of claim 8 wherein the neutralizing compound is an amine selected from the group consisting of methylamine, ethylamine, propylamine, isopropylamine, cyclohexylamine, p-aminophenol, aniline, diethylamine, dipropylamine, di-isopropylamine, trimethylamine, triethylamine, tri-isopropylamine, ethanolamine, diethanolamine, triethanolamine, ethylene diamine, hexamethylene diamine and mixtures thereof.

10. The aqueous dispersion of polymer produced by the method of claim 1.

11. The method of claim 2 wherein in step (d) a catalyst is combined with the aqueous dispersion and polyisocyanate.

12. The method of claim 11 wherein the catalyst is selected from the group consisting of dibutyl tin dilaurate, dibutyl tin diacetate, stannous octoate, zinc octoate, zinc carboxylate and mixtures thereof.

13. The method of claim 2 wherein the solvent is selected from the group consisting of ethyl acetate, butyl acetate, ethylene glycol monomethyl ether acetate, ethylene glycol monoethyl ether acetate, methoxypropyl acetate, 2-butanone, cyclohexanone, acetone, methyl ethyl ketone, methyl amyl ketone, toluene, xylene, propylene glycol diacetate, diethylene glycol dimethyl ether, diethylene glycol ethyl ether acetate, diethylene glycol butyl ether acetate, N-methyl-pyrrolidone, N-methylcaprolactam and mixtures thereof.

14. The method of claim 13 wherein at least some of the solvent is removed by vacuum distillation.

15. The method of claim 2 wherein the surfactant is selected from the group consisting of nonylphenol ethoxylate, ethyleneoxide-propyleneoxide copolymer and mixtures thereof.

16. The method of claim 2 further including the step of adding an amine compound to the polymer solution.

17. The method of claim 16 wherein the amine compound is selected from the group consisting of methylamine, ethylamine, propylamine, isopropylamine, cyclohexylamine, p-aminophenol, aniline, diethylamine, dipropylamine, di-isopropylamine, trimethylamine, triethylamine, tri-isopropylamine, ethanolamine, diethanolamine, triethanolamine, ethylene diamine, hexamethylene diamine and mixtures thereof.

18. The method of claim 2 wherein the polyisocyanate is derived from 1,6-hexamethylene diisocyanate.

19. The method of claim 2 wherein in step (d) a cosolvent is combined with the aqueous dispersion and polyisocyanate.

20. The coating composition produced by the method of claim 2.

21. The method of claim 2 wherein the —NCO/—OH ratio of the coating composition is no more than 1.5.

22. The coating composition of claim 20 wherein the —NCO/—OH ratio of the coating composition is no more than 1.5.

* * * * *